United States Patent [19]

Peterson

[11] 4,175,581

[45] Nov. 27, 1979

[54] APPARATUS FOR REMOVING A FITTING

[76] Inventor: Ralph L. Peterson, 27 Woodward Dr., West Seneca, N.Y. 14224

[21] Appl. No.: 891,073

[22] Filed: Mar. 29, 1978

[51] Int. Cl.² ............................................. F16K 43/00
[52] U.S. Cl. ............................... 137/319; 29/157.1 R; 138/94; 285/12; 285/199
[58] Field of Search ...................... 29/157.1 R, 401 F; 137/315, 317, 318, 319; 138/94, 97; 285/12, 197, 198, 199

[56] References Cited

U.S. PATENT DOCUMENTS

| | | | |
|---|---|---|---|
| 152,184 | 6/1874 | Sperring | 137/318 |
| 153,606 | 7/1874 | Plimley | 137/318 |
| 265,624 | 10/1882 | Mueller | 137/318 |
| 1,590,186 | 6/1926 | Fanselow | 137/318 |
| 2,656,083 | 10/1953 | Blomgren | 137/319 |
| 3,822,718 | 7/1974 | Peterson | 137/317 |
| 3,865,129 | 2/1975 | Peterson | 137/315 |
| 3,905,396 | 9/1975 | Peterson | 138/97 |

Primary Examiner—Martin P. Schwadron
Assistant Examiner—G. L. Walton
Attorney, Agent, or Firm—Sommer & Sommer

[57] ABSTRACT

Apparatus is provided to move a fitting relative to a hole provided through the wall of a water main or the like. The apparatus includes a housing provided with an internal chamber communicating with the atmosphere through two openings. The housing is mounted on the water main such that a marginal portion of the housing about the first opening surrounds a fitting positioned in such hole. A pivotal member is sealingly mounted in the second housing opening for pivotal movement relative to the housing. A rod slidably penetrates a throughbore provided through the pivotal member, and has one end arranged to move toward and away from the hole. This rod end carries an adapter which may be engaged with a fitting. Thereafter, the rod may be selectively manipulated to move the fitting relative to the hole.

5 Claims, 3 Drawing Figures

APPARATUS FOR REMOVING A FITTING

BACKGROUND OF THE INVENTION

1. Field of the Invention

The present invention relates generally to apparatus for moving a fitting relative to a hole provided through the wall of an object, and more particularly to improved apparatus for moving either a plug or threaded fitting relative to a hole of a pressurized water main or the like.

2. Background of the Invention

Apparatus has been heretofore developed for moving a plug fitting relative to a hole in a conduit. Indeed, an example of such apparatus is shown in my prior U.S. Pat. Nos. 3,822,718 and 3,905,396.

More recently, others have developed structure for filling or bleeding fluid out of a container, as shown in U.S. Pat. No. 4,071,012.

During excavating work, a fitting arranged in a hole of a water or gas main, for example, is frequently damaged. While such damage may be unintentional, in many cases the nature of the damage is such that the fitting must be replaced. The problem here is that a water or gas main is generally pressurized relative to the atmosphere, and it is generally undesirable to shut down an entire main simply to repair or replace a single fitting.

Accordingly, the present invention provides apparatus which may be used to remove or exchange such damaged fittings, without interruption of service to the consumers.

SUMMARY OF THE INVENTION

The present invention provides improved apparatus for moving a fitting relative to a hole provided through the wall of an object.

The improved apparatus broadly includes a housing provided with a chamber herewithin and having two opening communicating this chamber with the atmosphere; mounting means adapted to sealingly secure the housing to the object such that a marginal portion of the housing about a first of the openings will surround the hole in substantially fluid-tight connection with the object; a pivotal member sealingly mounted in the second of the housing openings for pivotal movement relative to the housing, this pivotal member being provided with a through-bore; a rod sealingly mounted in the through-bore and having one marginal end portion arranged for selective movement toward and away from the first housing opening; and engagement means carried by the rod marginal end portion and adapted to engage a fitting; whereby, when the engagement means is engaged with a fitting, the rod may be selectively manipulated to move the fitting relative to the hole.

Accordingly, the general object of the present invention is to provide improved apparatus for moving a fitting.

Another general object is to provide improved apparatus for exchanging fittings in a pressurized duct or conduit.

Still another general object is to provide improved apparatus capable of manipulating more than one type of fitting.

These and other objects and advantages will become apparent from the foregoing and ongoing written specification, the drawings, and the appended claims.

DESCRIPTION OF THE PREFERRED EMBODIMENTS

Figure 1:
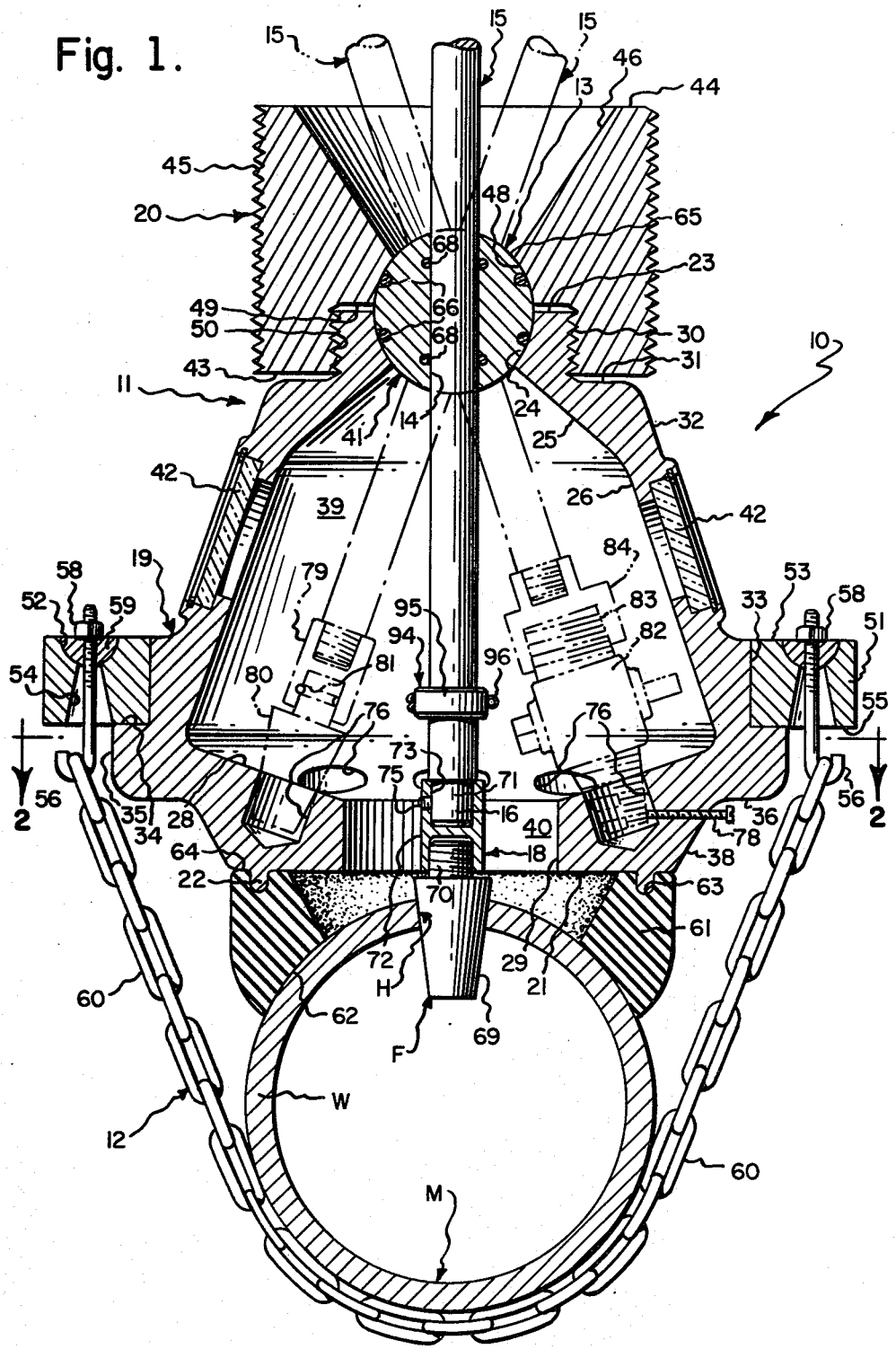
FIG. 1 is a fragmentary vertical sectional view of the improved apparatus operatively mounted on a water main, this view particularly showing several possible positions of the rod, and further showing the housing and the pivotal member.

At the outset, it should be clearly understood that like reference numerals are intended to identify the same structure, portions or surfaces consistently throughout the several drawing figures, as such structure, portions or surfaces may be further described or explained by the entire written specification of which this detailed description is an integral part.

Referring now to the several drawing figures, and more particularly to FIG. 1 thereof, the invention provides apparatus, of which the presently preferred embodiment is generally indicated at 10, for moving a fitting relative to a hole provided through the wall of an object.

In the accompanying drawings, the object is specifically illustrated as being a water main M having a cylindrical wall W provided with a hole H bounded by a tapered frusto-conical surface. However, it should be clearly understood that the word "object" is broadly intended to include other types of containment vessels, such as pipes and the like, regardless of whether a fluid therewithin is positively or negatively pressurized relative to the atmosphere. Indeed, the term "object" need not necessarily be limited to a fluid carrying duct or containment facility. Accordingly, the term "object", as used herein, is intended in its broad generic sense.

In like manner, the "hole" need not be limited to the specific tapered hole shown in the drawings. Alternatively, such hole may be bounded by cylindrical side walls, and/or may be tapped to receive a threaded end portion of a fitting. Indeed, such hole may simply be a recess provided in the wall.

Also, the term "fitting" is intended to refer to a plug or some other device which may be inserted or threaded into a hole. Examples of such "fittings" include, but are not limited to, plugs, nipples, valves, pipes and the like. It is expressly contemplated that such "fittings" may have, inter alia, tapered, cylindrical or threaded end portions.

Adverting now to FIG. 1, the apparatus 10 is shown as broadly including a two-part housing, generally indicated at 11; mounting means generally indicated at 12, adapted to sealingly secure the housing to an object; a pivotal member, generally indicated at 13, mounted on the housing for pivotal movement relative thereto and provided with a through-bore 14; a rod, generally indicated at 15, mounted in the pivotal member through-bore and having one marginal end portion 16 arranged for selective movement toward and away from hole H; and engagement means, generally indicated at 18, carried by such rod marginal end portion and adapted to engage a fitting.

As previously noted, the housing 11 is a two-part member, and includes a lower part 19 and an upper part 20. The housing lower part 19 is shown as including an annular horizontal lower surface 21, from which an annular boss or lip 22 extends downwardly; an annular horizontal upper surface 23; an inner surface including, from top to bottom in FIG. 1, a spherically-segmented concave surface 24 extending downwardly from upper surface 23, a downwardly-divergent frusto-conical surface 25, a less tapered downwardly-divergent frusto-conical surface 26, a downwardly-convergent frusto-conical surface 28, and a cylindrical surface 29 continuing downwardly therefrom to join the lower surface 21; and an outer surface including, from top to bottom in FIG. 1, an externally-threaded cylindrical portion 30 extending downwardly from upper surface 23, an upwardly-facing annular horizontal shoulder 31, a downwardly-divergent frusto-conical surface 32 extending generally parallel to inner surface 26, a vertical cylindrical surface 33, an upwardly-facing annular horizontal surface 34, a vertical cylindrical surface 35, a downwardly-facing annular horizontal surface 36, and a downwardly-convergent frusto-conical surface 38 continuing downwardly therefrom to join lower surface 21.

Thus, the housing lower part 19 is provided with an internal chamber 39, which chamber is normally communicated with the atmosphere by a lower first opening 40, bounded by surface 29, and by an upper second opening 41, bounded by the inwardly-facing spherically-segmented surface 24.

If desired, one or more transparent windows 42 may be operatively arranged in suitable openings provided through the housing lower part, to enable an operator to see into the chamber 39. The number and size of such windows are regarded as being a matter of design choice. Indeed, depending principally upon the pressures which the housing will be required to withstand, it may be possible to form the entire housing lower part of a suitable transparent plastic material.

The housing upper part 20 is shown as having an annular horizontal lower surface 43; an annular horizontal upper surface 44; a vertical externally-threaded outer surface 45; an inner surface including, from top to bottom in FIG. 1, a downwardly-convergent frusto-conical surface 46, an inwardly-facing spherically-segmented concave surface 48, a downwardly-facing annular horizontal surface 49, and an internally-threaded vertical cylindrical surface 50 continuing downwardly therefrom to join lower surface 43. Housing upper part surface 50 is adapted to be threaded onto housing lower part surface 30 to operatively join these two members together. At the same time, it should be noted that, as seen in FIG. 1, the spherically-segmented concave surfaces 24, 48 appear to have portions arranged in all four quadrants, so as to capture a spherical object interposed therewithin.

The mounting means 12 is shown as including an annular cylindrical ring 51 adapted to be received in the annular shoulder provided on the housing lower part and defined by outer surfaces 33, 34. This ring 51 is provided with two vertical through-holes spaced diametrically from one another. Specifically, each such through-hole is bounded by a spherically-segmented surface 52 extending downwardly into the ring from its horizontal upper surface 53, and a downwardly-divergent frusto-conical surface 54 joining surface 52 and extending downwardly therefrom to join the ring horizontal lower surface 55.

The mounting means 12 further includes a J-hook 56 operatively penetrating each ring through-hole and having a nut 58 threaded onto its upper marginal end portion and engaging a washer 59 having a lower convex spherically-segmented surface arranged to face surface 52; a flexible member, such as chain 60, having its distal links received on the hooks of J-hooks 56; and an annular resilient member 61 operatively interposed between the housing lower part 19 and the main M to establish a substantially fluid-tight connection therebetween. Specifically, the lower surface 62 of resilient member 61 is configured as an annular saddle resting on the main outer surface about hole H, and has an annular recess 63 extending downwardly into the resilient member from its annular horizontal upper surface 64 to receive insertion of housing part depending annular lip 22. Thus, after the mounting means 12 is arranged as shown in FIG. 1, nuts 58 may be selectively tightened to compress resilient member 61 between the housing and main, thereby to establish a substantially fluid-tight connection between these two members.

Still referring principally to FIG. 1, the pivotal member 13 is shown as being a ball having a spherical convex outer surface 65 captured within the upper and lower housing part concave spherically-segmented surface 48, 24, so as to permit omnidirectional pivotal movement of the ball relative to the housing. To this end, O-Rings 66, 66 are received in suitable grooves provided in the ball to sealingly engage housing surfaces 48, 24. While use of a spherical ball is preferred because such shape enables omnidirectional pivotal movement of the pivotal member, such member could alternatively be provided with a cylindrical outer surface. Of course, in such modification, the housing part surfaces 48, 24 would be configured as concave cylindrical segments. However, it should be noted that such a cylindrical pivotal member would be constrained to pivot or rotate about a line axis, namely, that of the cylinder, and would not afford the additional capability of omnidirectional movement about a point axis, as in the case of the spherical ball.

The rod 15 is shown as being a vertically-elongated cylindrical member having an intermediate portion of its longitudinal extent slidably mounted in pivotal member throughbore 14. O-Rings 68 are received in grooves provided in the pivotal member to sealingly engage the rod. Alternatively, a threaded connection between the rod and pivotal member could be provided such that selective rotation of the rod relative to the pivotal member would cause the rod lower marginal end portion 16 to move either toward or away from the hole H. In either case, it is deemed desirable that the pivotal member be mounted for pivotal movement relative to the housing, and that the rod be operatively mounted on the pivotal member such that the rod marginal end portion may move toward such and away from a fitting to be serviced, as hereinafter described.

In FIG. 1, a tapered plug fitting F is shown as being arranged within hole H. Specifically, this fitting F has a tapered downwardly-convergent frusto-conical surface 69 adapted to be received in hole H, and has an upper head portion 70 provided with an externally-threaded outer surface.

The engagement means 18 is mounted on the rod lower marginal portion 16 and is adapted to engage fitting F. In this regard, the present invention contemplates many possible variations of such engagement means. In FIG. 1, the rod marginal end portion 16 is shown as provided with a lowermost square drive portion 71. An adapter 72 has an upper square socket 73 adapted to receive insertion of the square drive 71, and has a lower internally-threaded socket 74 adapted to be threaded on plug threaded portion 70. If desired, a set screw 75 may penetrate the adapter to engage the drive 71 and to establish a positive connection between the adapter and rod. In this manner, rod 15 may be suitably rotated to thread the adapter on to the fitting, after which the rod may be moved upwardly to withdraw the fitting from hole H. If such adapter 72 was only used to insert a plug fitting axially into hole H, a simple drive-and-socket connection therebetween might be employed.

Figure 2:
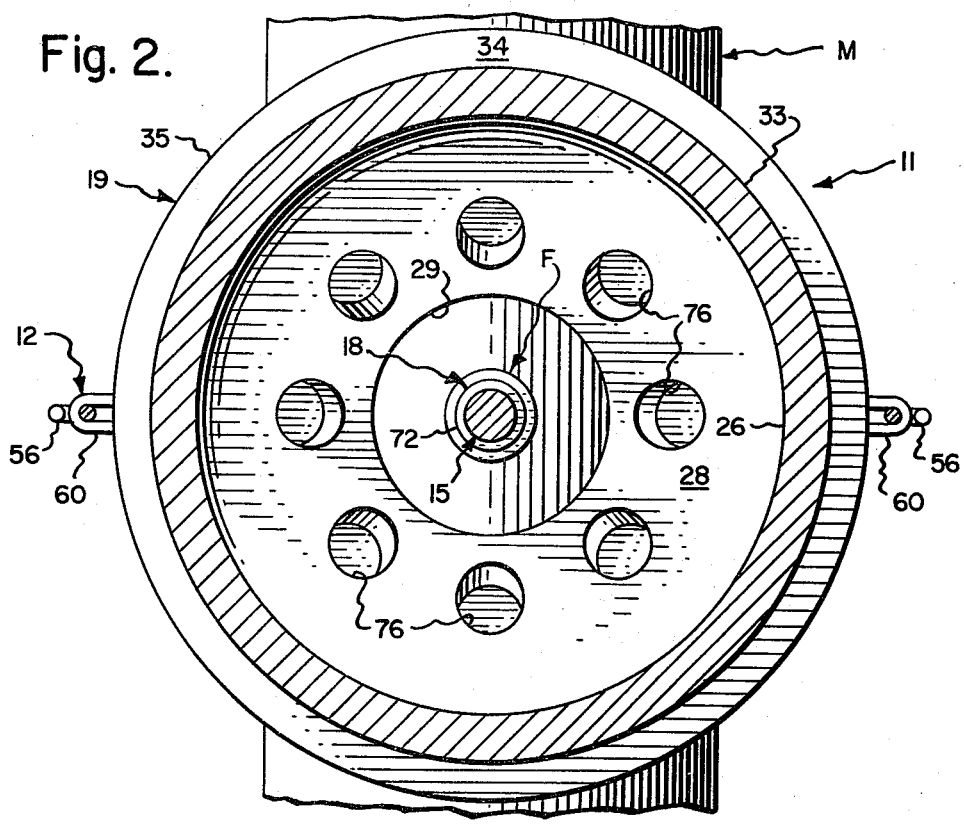
FIG. 2 is a fragmentary horizontal vertical sectional view thereof, taken generally on line 2—2 of FIG. 1, this view showing the fitting storage recesses spaced about the housing.

Referring now to FIGS. 1 and 2, the housing lower part 19 is preferably provided with a plurality of storage recesses 76 circumferentially spaced from one another. As shown, these recesses 76 extend into the housing lower part from surface 28, and the longitudinal axis of each recess is preferably aligned with the axis of pivotal member 13. As best shown in FIG. 2, eight of such recesses 76 may be provided, although a greater or lesser number may be alternatively provided. Moreover, each recess 76 need not necessarily have cylindrical side walls, as shown. Some recesses could be tapered or internally-threaded, to accommodate different types of fittings. Indeed, one or more of these recesses could be provided with a set screw 78, or equivalent, operable from without the chamber to selectively prevent relative rotation between a fitting and a suitable adapter.

In FIG. 1, two other positions of rod 15 are shown in phantom. In either of these other positions, an adapter mounted on the rod marginal end portion is shown as being operatively engaged with a different plug fitting. A modified adapter 79 shown in phantom to the left has a threaded connection with the rod marginal end portion, and has a snapable detent-type of connection with a modified plug fitting 80 provided with a cooperative annular recess 81.

The fitting shown in phantom to the right, is a valve 82 having a threaded upper neck 83. In this instance, a further modified adapter 84 has a threaded connection with the rod marginal end portion, and has a threaded connection with such fitting neck 83. If desired, the engagement means 18 may be of the type shown in my prior U.S. Pat. Nos. 3,822,718 and 3,905,396, the aggregate disclosures of which are hereby incorporated by reference.

Figure 3:
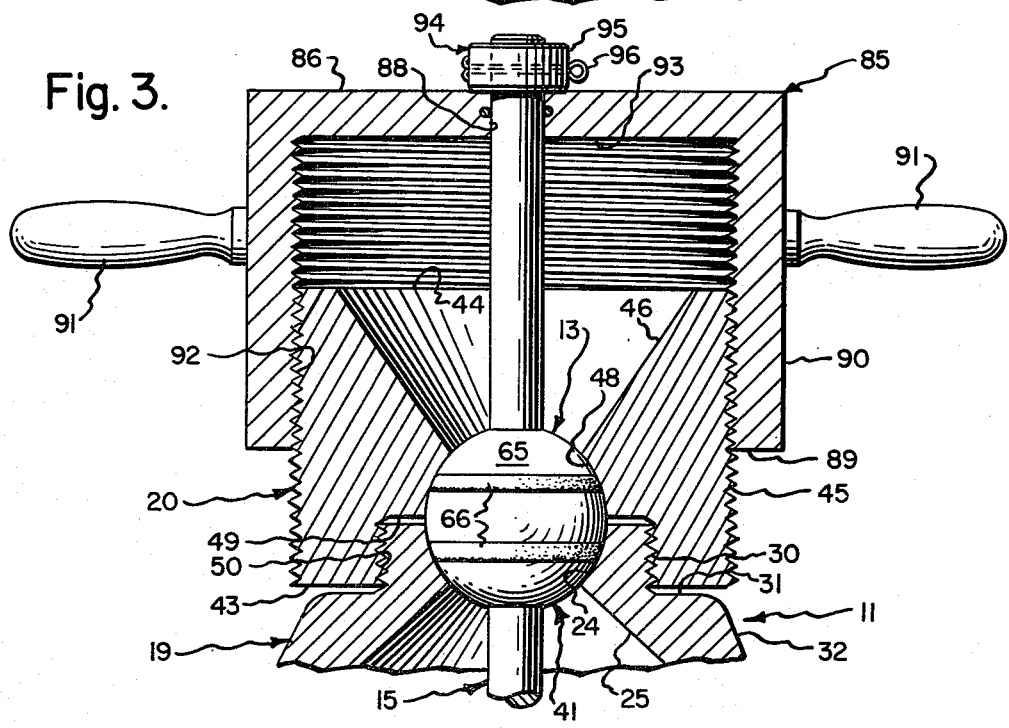
FIG. 3 is a fragmentary vertical sectional view of the upper portion of the housing, and further showing the cap threaded on the housing upper part to realign the rod with the hole.

Referring now to FIG. 3, the improved apparatus 10 may further include a cap, generally indicated at 85, which may be mounted on the housing upper part 20. This cap is shown as having a circular horizontal upper surface 86 provided with an axial vertical through-bore 88; an annular horizontal lower surface 89; a cylindrical outer surface 90 from which a pair of handles 91, 91 extend radially outwardly; and an inner surface including an internally-threaded portion 92 and a downwardly-facing annular horizontal surface 93. The purpose of this cap 85 is to provide a means by which the rod may be initially positioned and repeatedly realigned with the hole H. To this end, cap 85 need only be slid over the upper portion of the rod, such that the rod penetrates the cap through-bore 88. Thereafter, the cap may be threaded onto the housing upper part. With this cap in place, movement of pivotal member 13 will be restrained, and rod 15 will be constrained to move either axially or rotatively about its longitudinal axis. The use of such cap may be particularly advantageous in accurately aligning a fitting to be inserted with the hole.

Adverting now to FIGS. 1 and 3, the rod 15 may be provided with one or more suitable stops, severally indicated at 94, to limit axial sliding movement of the rod relative to the cap and the pivotal member. Each of these stops may simply include a collar member 95, and either a set screw or cotter pin 96, adjustably connecting the collar to the rod at a desired position.

From the foregoing, it will be seen that the present invention provides improved apparatus which is uniquely adapted to move a fitting relative to a hole provided through the wall of an object. After the apparatus has been mounted on the object, the rod may be suitably manipulated to withdraw a fitting from the hole, to place such withdrawn fitting in an empty storage recess, to engage another fitting, and to insert such new fitting into the hole, all while the main or object is pressurized relative to the atmosphere. During such operation, the rod may be slid axially toward or away from the hole, or even hammered to seat a tapered fitting, or may be rotated to thread a fitting into or out of engagement with a tapped hole.

Of course, the present invention possesses utility apart from the specific environment shown in the drawings. For example, the engagement means 18 could be configured as a screwdriver to simply rotate a suitable fitting, such as a slotted bleed screw or the like. Also, the rod 15 could have two or more telescopically mounted members, as generally taught by my prior U.S. Pat. No. 3,905,396, to afford the capability of performing still more useful operations. The various rotatable members, such as housing upper part 20, rod 15, and cap 85, may be provided with graspable handles, if desired. Indeed, it may be desirable to secure a relatively large mass object to the upper portion of the rod, which object may be hammered from above or below to insert or withdraw a fitting tightly press-fitted in hole H.

Of course, while the presently preferred embodiment of the improved apparatus has been shown and described, and several modifications thereof discussed, persons skilled in this art will readily appreciate that various additional changes and modifications may be made without departing from the broad spirit of the invention which, is defined by the following claims.

What is claimed is:

1. Apparatus for moving a fitting relative to a hole provided in a wall, comprising:

a housing provided with a chamber therewithin and having a first opening and a second opening, each of said openings communicating said chamber with the atmosphere, a marginal portion of said housing about said second opening having a concave surface configured as a segment of a surface of revolution;

mounting means adapted to secure said housing to said wall such that a marginal portion of said housing about said first opening will sealingly surround said hole;

a pivotal member having a convex outer surface configured as a segment of a surface of revolution and provided with a through-bore, said pivotal member being sealingly mounted in said second opening such that said convex surface is arranged to face said concave surface to enable pivotal movement of said member relative to said housing about an axis normal to the axis of said through-bore;

a rod sealingly and slidably mounted in said through-bore and having one marginal end portion arranged for selective movement toward and away from said first opening; and engagement means carried by said rod marginal end portion and adapted to engage a fitting;

whereby when said engagement means is engaged with a fitting, said rod may be pivotally and axially manipulated to move said fitting relative to said hole.

2. The apparatus as set forth in claim 1 wherein said housing concave surface is configured as a segment of a spherical surface, and wherein said pivotal member convex surface is configured as a segment of a spherical surface, thereby to enable omnidirectional pivotal movement of said pivotal member relative to said housing.

3. The apparatus as set forth in claim 1 wherein said housing is provided a third such opening, and further comprising a transparent window mounted in said third opening to enable an operator to see into said chamber.

4. The apparatus as set forth in claim 1 and further comprising a cap mounted on said housing and having an opening aligned with said through-bore and said hole, and wherein a portion of said rod is arranged to penetrate said cap opening to position said rod in an aligned relationship with respect to said hole.

5. The apparatus as set forth in claim 1 wherein a plurality of recesses extend into said housing from a surface facing into said chamber, said recesses being adapted to receive and store fittings.

* * * * *